US009523053B2

(12) United States Patent
Murakami et al.

(10) Patent No.: US 9,523,053 B2
(45) Date of Patent: Dec. 20, 2016

(54) FUEL GASIFICATION SYSTEM INCLUDING A TAR DECOMPOSER

(71) Applicant: IHI Corporation, Koto-ku (JP)

(72) Inventors: Takahiro Murakami, Koto-ku (JP); Koubun Kyo, Koto-ku (JP); Toshiyuki Suda, Koto-ku (JP)

(73) Assignee: IHI CORPORATION, Koto-ku (JP)

( * ) Notice: Subject to any disclaimer, the term of this patent is extended or adjusted under 35 U.S.C. 154(b) by 218 days.

(21) Appl. No.: 14/247,892

(22) Filed: Apr. 8, 2014

(65) Prior Publication Data

US 2014/0215922 A1 Aug. 7, 2014

Related U.S. Application Data

(62) Division of application No. 13/683,265, filed on Nov. 21, 2012, now Pat. No. 8,747,501, which is a division of application No. 12/527,432, filed as application No. PCT/JP2007/000113 on Feb. 22, 2007, now abandoned.

(51) Int. Cl.
*B01J 7/00* (2006.01)
*C10J 3/84* (2006.01)
*C10J 3/48* (2006.01)
*C10J 3/56* (2006.01)
(Continued)

(52) U.S. Cl.
CPC *C10J 3/84* (2013.01); *C10J 3/482* (2013.01); *C10J 3/485* (2013.01); *C10J 3/56* (2013.01); *C10J 3/721* (2013.01); *F27B 15/00* (2013.01); *C10J 2300/0956* (2013.01); *C10J 2300/0959* (2013.01); *C10J 2300/0973* (2013.01); *C10J 2300/0993* (2013.01); *C10J 2300/1671* (2013.01); *C10J 2300/1807* (2013.01)

(58) Field of Classification Search
CPC ................ C10J 2300/1807; C10J 3/482; C10J 2300/0993; C10J 3/56; C10J 3/463; F23C 10/10; F23G 5/30; F23G 2201/40; F23G 2203/501
See application file for complete search history.

(56) References Cited

U.S. PATENT DOCUMENTS 4,519,810 A 5/1985 Haas
2007/0094929 A1* 5/2007 Kang .......................... C10J 3/54 48/111

(Continued)

FOREIGN PATENT DOCUMENTS

JP 2006-132885 * 5/2006

*Primary Examiner* — Imran Akram
(74) *Attorney, Agent, or Firm* — Oblon, McClelland, Maier & Neustadt, L.L.P.

(57) ABSTRACT

A fuel gasification system including a gasification furnace including a fluidized bed formed by fluidizing reactant gas for gasifying fuel charged into gasification gas and flammable solid content, a combustion furnace for combustion of the flammable solid content into which the flammable solid content produced in the furnace is introduced together with bed material and that includes a fluidized bed formed by fluidizing reactant gas, a material separator such as hot cyclone that separates bed material from exhaust gas introduced from the combustion furnace, the separated bed material being fed through a downcomer to the gasification furnace, and a tar decomposing mechanism that heats the gasification gas produced in the furnace to decompose tar contained in the gasification gas.

4 Claims, 5 Drawing Sheets

(51) Int. Cl.
*C10J 3/72* (2006.01)
*F27B 15/00* (2006.01)

(56) References Cited

U.S. PATENT DOCUMENTS

| | | | | |
|---|---|---|---|---|
| 2008/0244976 | A1* | 10/2008 | Paisley | C07C 4/04<br>48/62 R |
| 2009/0126271 | A1* | 5/2009 | Kyo | C10J 3/463<br>48/77 |

* cited by examiner

FUEL GASIFICATION SYSTEM INCLUDING A TAR DECOMPOSER

CROSS-REFERENCE TO RELATED APPLICATIONS

This application is a division of U.S. application Ser. No. 13/683,265 filed Nov. 21, 2012, which is a division of U.S. application Ser. No. 12/527,432 filed Aug. 17, 2009, the entire contents of each of which are incorporated herein by reference, U.S. application Ser. No, 12/527,432 is a National Stage of PCT/JP07/000113 filed Feb. 22, 2007, International Application No. PCT/JP07/000113 is based on prior Japanese Patent Application No. 2005-304469 filed October 19, 2005.

TECHNICAL FIELD

The present invention relates to a fuel gasification system.

BACKGROUND ART

A fuel gasification system has been developed to produce gasification gas, using coal, biomass, waste plastic, various wet wastes or the like as fuel.

In the fuel gasification system, tar is contained in gasification gas produced in a gasification furnace. Especially heavy oil component of the tar is highly viscous and tends to attach to piping or the like, resulting disadvantageously in clogging of the piping or the like in a long-term operation.

In order to overcome such disadvantage, there has been, for example, a fuel gasification system as shown in FIG. 1 which comprises a gasification furnace 100 for partly oxidizing fuel such as coal, biomass, waste plastic or various wet wastes into gasification gas, a steam generator 101 for generating steam to be fed to the furnace 100, a scrubber 102 for separating tar and the like from the gasification gas produced in the furnace 100, an electric dust collector 103 for capturing particles and the like from the gasification gas having been free from the tar and the like in the scrubber 102, an internal-combustion engine 104 such as gas engine or gas turbine driven by burning as fuel the gasification gas having been free from the particles and the like in the collector 103, an electric generator 105 driven by the engine 104, a thermal energy recovery device 106 comprising, for example, a heat exchanger for heat recovery of the gas discharged from the engine 104, a flue 107 for discharging to atmosphere the exhaust gas having been heat-recovered in the recovery device 106, a tar/water separator 108 for separating tar and water having been separated from the gasification gas in the scrubber 102, a tar tank 109 for recovering the tar having been separated in the separator 108 and a combustion furnace 110 for burning the tar recovered in the tank 109.

In the fuel gasification system shown in FIG. 1, the fuel such as coal, biomass, waste plastic or various wet wastes is partly oxidized in the gasification furnace 100 into gasification gas which is introduced into the scrubber 102 here water is sprayed to the gasification gas to separate tar and the like and condense steam in the gasification gas. The gasification gas having been free from the tar and the like is introduced into the electric dust collector 103 where particles and the like in the gasification gas are captured. The gasification gas having been free from the particles and the like is burned as fuel to drive the engine 104 to generate electricity in the electric genera 105. The exhaust gas from the engine 104 is heat-exchanged with air in the thermal energy recovery device 106 for heat recovery and is discharged to atmosphere through the flue 107.

The tar having been separated from the gasification gas by spraying water in the scrubber 102 is separated from the water in the tar/water separator 108. The tar having been separated from the water in the separator 108 is recovered in the tar tank 109 and is burned in the combustion furnace 110. The water having been separated from the tar in the tar/water separator 108 is turned into steam in the steam generator 101 and is fed to the gasification furnace 100 together with the air heated in the thermal energy recovery device 106.

In the conventional fuel gasification system, the gasification furnace 100 may be followed by a reforming furnace to which oxygen is fed to partly burn the gasification gas for decomposition of the tar.

State of the art technology of a fuel gasification system for partly oxidizing fuel such as coal through an oxidizing aunt into gasification gas is shown, for example, in Reference 1.

[Reference 1] JP 2000-355693A

SUMMARY OF THE INVENTION

Problems to be Solved by the Invention

However, recovery of tar by the scrubber 102 and tar/water separator 108 as mentioned above is costly in terms of wastewater treatment; moreover, feeding of the recovered tar to the combustion furnace 110 for burning the same makes it difficult to enhance gasification efficiency.

The fact that the gasification furnace 100 is followed by the reforming furnace to which oxygen is fed for partial combustion of the gasification gas increases concentration of carbon dioxide, so that enhancement of gasification efficiency is still unhopeful.

The invention was made in view of the above and has its object to provide a fuel gasification system which can efficiently decompose tar and the like in gasification gas without use of water and the like, which can prevent tar from attaching to piping or the like, which enables long-term operation and which can enhance gasification efficiency.

Means or Measures for Solving the Problems

The invention is directed to a fuel gasification system comprising tar decomposer for heating gasification gas produced in a gasification furnace to decompose tar in said gasification gas.

In said fuel gasification system, it is effective that the tar decomposer is constituted by a double-pipe heat exchanger which comprises coaxially arranged inner and outer pipes, exhaust gas from a combustion furnace and separated in a material separator being introduced into an exhaust gas passage in the inner pipe while gasification gas is introduced into a gasification passage between the inner and outer pipes and is heated by the exhaust gas from the combustion furnace.

In said fuel gasification system, alternatively, the tar decomposer may be constituted by a double-pipe heat exchanger which comprises coaxially arranged inner and outer pipes, gasification gas being introduced into a gasification gas passage in the inner pipe while the exhaust gas from the combustion furnace and separated in a material separator is introduced in an exhaust gas passage between the inner and outer pipes, said gasification gas being heated by the exhaust gas from the combustion furnace.

In these cases, additional heater may be provided so as to elevate in temperature the exhaust gas introduced into the exhaust gas passage.

The invention is also directed to a fuel gasification system comprising a gasification furnace which has a fluidized bed formed by fluidizing reactant gas to gasify charged fuel into gasification gas and flammable solid content, a combustion furnace into which the flammable solid content generated in the gasification furnace is introduced together with bed material and which has a fluidized bed formed by fluidizing reactant gas to burn the flammable solid content and a material separator for separating bed material from the exhaust gas introduced from the combustion furnace to feed the separated bed material to said gasification furnace, said fuel gasification system comprising decomposer for heating the gasification gas produced in the gasification furnace to decompose tar contained in the gasification gas.

In the fuel gasification system, the tar decomposer may be constituted by a heat exchanger comprising an gasification gas passage formed on an inner surface of the combustion furnace, the gasification gas being introduced into the gasification gas passage and heated by heat of the combustion furnace.

In the fuel gasification system, the tar decomposer may be constituted by a heat exchanger comprising an gasification gas passage formed on an outer surface of the combustion furnace, the gasification gas being introduced into the gasification gas passage and heated by heat of the combustion furnace.

In the fuel gasification system, the tar decomposer may be constituted by a heat exchanger comprising a gasification gas passage formed on an outer surface of a downcomer for guiding bed material separated in a material separator to the gasification furnace, the gasification gas being introduced into the gasification gas passage and heated by heat of the downcomer.

On an outer surface of the heat exchanger comprising the gasification gas passage formed on the outer surface of the combustion furnace or downcomer, an exhaust gas passage may be formed into which introduced is the exhaust gas from the combustion furnace and elevated in temperature by additional heater In the fuel gasification system, it is preferable that the gasification gas passage is a spiral passage.

To arrange the gasification gas passage vertically is effective in terms of arrangement space.

Effects of the Invention

A fuel gasification system of the invention can exhibit excellent effects and advantages that tar contained in gasification gas can be efficiently decomposed without use of water and the like, that the tar can be prevented from attaching to piping or the like, that a long-term operation can be conducted and that gasification efficiency can be enhanced.

EXPLANATION OF THE REFERENCE NUMERALS

Figure 1:
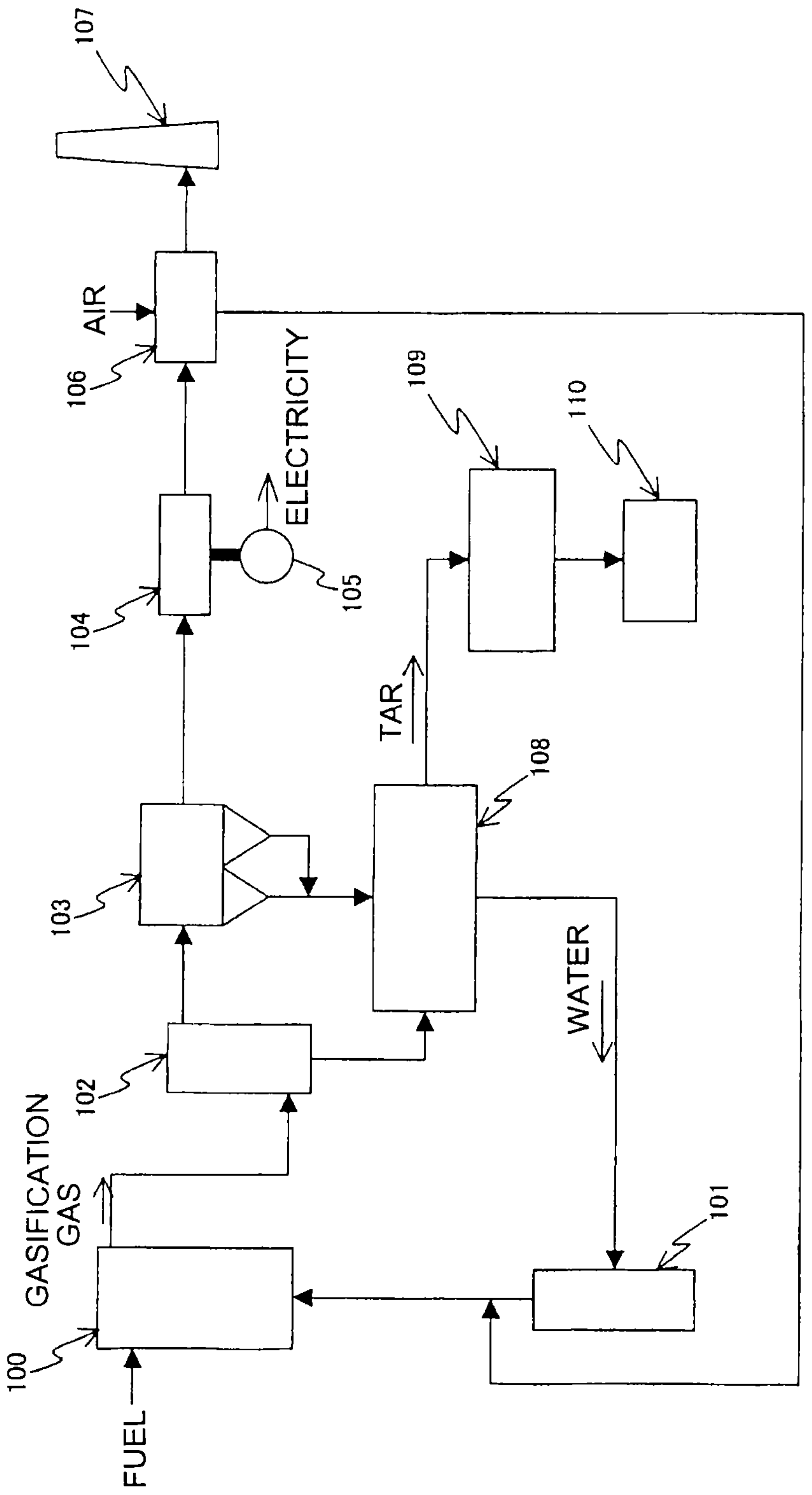
FIG. 1 An overall schematic view showing a conventional fuel gasification system.

1 fluidized bed
2 gasification furnace
3 introduction pipe
4 fluidized bed
5 combustion furnace
6 exhaust gas pipe
7 downcomer
8 material separator
9 tar decomposer
10 inner pipe
11 outer pipe
12 exhaust gas passage
13 gasification gas passage
13*a* spiral passage
14 double-pipe heat exchanger
16 additional heater
17 inspection window
23 heat exchanger
24 heat exchanger
25 heat exchanger

Best Mode for Carrying Out the Invention

Embodiments of the invention will be described in conjunction with the attached drawings.

[Embodiment 1]

Figure 2:
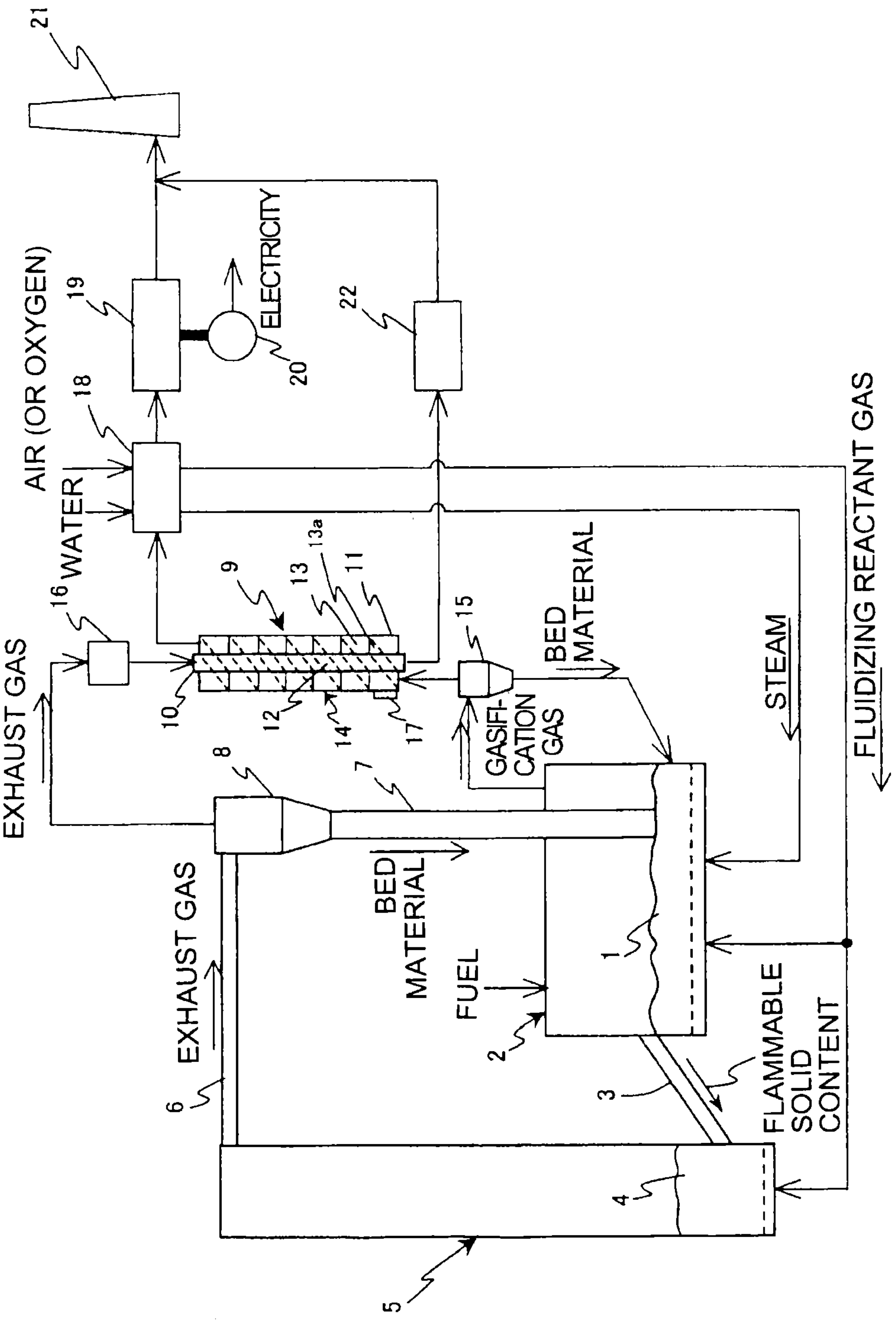
FIG. 2 An overall schematic view showing a first embodiment of the invention.

FIG. 2 shows a first embodiment a fuel gasification system according to the invention which comprises a gasification furnace 2 with a fluidized bed 1 formed therein through steam and fluidizing reactant gas such as air or oxygen so as to gasify charged fuel such as coal, biomass, waste plastic or various wet wastes into gasification gas and flammable solid content; a combustion furnace 5 into which the flammable solid content produced in the gasification furnace 2 is introduced via an introduction pipe 3 together with bed material and in which a fluidized bed 4 is formed by the fluidizing reactant gas to burn the flammable solid content; and a material separator 8 such s hot cyclone into which the exhaust gas is introduced from the combustion furnace 5 via an exhaust gas pipe 6 to be separated from the bed material which in turn is fed via a downcomer 7 into the gasification furnace 2, the fuel gasification system being provided with tar decompose 9 which heats the gasification gas produced in the gasification furnace 2 to decompose tar contained in the gasification gas.

In this embodiment, the tar decomposer 9 is constituted by a double-pipe heat exchanger 14 comprising vertically extending and coaxially arranged inner and outer pipes 10 and 11, the exhaust gas from the combustion furnace 5 and separated in the separator 8 being introduced into an exhaust gas passage 12 in the inner pipe 10 while the gasification gas produced in the gasification furnace 2 and separated from bed material in the separator 15 is introduced into a gasification gas passage 13 between the inner and outer pipes 10 and 11 so as to he heated by said exhaust gas from the combustion furnace 5, the bed material separated from the gasification gas being returned to the gasification furnace 2. Alternatively, the gasification and exhaust gas passages may be formed in the pipe 10 and between the pipes 10 and 11, respectively, the exhaust gas from the combustion furnace 5 and separated in the separator 8 being introduced into the passage between the pipes 10 and 11 while the gasification gas is introduced into the passage in the pipe 10.

It has been generally known that, when tar is contained in gas, the tar will be decomposed providing that the gas is retained at about 800° C. (1073K) for 15 seconds or at about 1000° C. (1273K) for 5 seconds. in order to satisfy such provision, there may be provided, as needs demand, additional heater 16 such as combustor for elevating in temperature the exhaust gas to be introduced into the passage 12 so as to heat the gasification gas, the gasification gas passage 13 being in the form of a spiral passage 13*a* with heat storage material (not shown) so as to secure sufficient dwell time of the gasification gas in the double-pipe heat exchanger 14 while maintaining high temperature. The outer pipe 11 of the heat exchanger 14 is formed at its bottom with a inspection window 17 for ascertaining attaching status of the tar in the passage 13; depending upon the attaching status ascertained through the window 17, additional fuel may be fed to the additional heater 16 so as to elevate in temperature the exhaust gas. Of course, it is not necessary to provide the additional heater 16 when the exhaust gas discharged from the combustion furnace 5 has satisfactorily high temperature; of course, it is not necessary to make the gasification gas passage in the form of the spiral passage 13*a* when enough dwell time of the gasification gas can be secured in the heat exchanger 14.

In the fuel gasification system shown in FIG. 2, the gasification gas having been passed through the passage 13 in the heat exchanger 14 with the tar contained being decomposed is heat-exchanged with water and air or oxygen in the thermal energy recovery device 18 so that steam and fluidizing reactant gas such as air or oxygen is produced. The steam produced is fed to a bottom of the gasification furnace 2 while the fluidizing reactant gas is fed to bottoms of the furnaces 2 and 5 so as to form the fluidized beds 1 and 4, respectively. The gasification gas heat-recovered in the recovery device 18 is burned in the internal-combustion engine 19 to drive the engine 19 for generation of electricity in the electric generator 20. The exhaust gas having driven the engine 19 is discharged through the flue 21 to atmosphere. Instead of feeding the gasification gas heat-recovered in the recovery device 18 to the engine 19, it may be fed to a gas-to-liquids device (not shown) so as to recover hydrogen, carbon monoxide, ethanol, DME (dimethyl ether) or the like.

The exhaust gas having been passed through the passage 12 in the heat exchanger 14 is further heat-recovered in a thermal energy recovery device 22 comprising a heat exchanger or the like and is discharged via the flue 21 to atmosphere.

Next, mode of operation of the above embodiment will be described.

In the gasification furnace 2, when fuel such as coal, biomass, waste plastic or various wet wastes is charged into the fluidized bed 1 formed by the steam and the fluidizing reactant gas such as air or oxygen, the fuel is partly oxidized into gasification so that gasification gas and flammable solid content are produced. The flammable solid content produced in the furnace 2 is introduced through the pipe 3 together with the bed material into the combustion furnace 5 where the fluidized bed 4 is formed by the fluidizing reactant gas, so that the flammable solid content is burned. The exhaust gas from the combustion furnace 5 is introduced via the exhaust gas pipe 6 into the material separator 8 where the bed material is separated from the exhaust gas and is returned via the downcomer 7 to the gasification furnace 2 to be circulated. In the gasification furnace 2, high temperature is retained in the presence of the steam fed to the bottom of the furnace 2 and moisture evaporating from the fuel itself, so that water gasification reaction ($C+H2O=H2+CO$) and/or hydrogen transfer reaction ($CO+H2O=H2+CO2$) occurs, resulting in production of flammable gasification gas such as H2 or CO.

The gasification gas produced in the gasification furnace 2 is separated from the bed material in the material separator 15 and is introduced into the passage 13 between the inner and outer pipes 10 and 11 of the double-pipe heat exchanger 14 constituting the tar decomposer 9; the exhaust gas from the combustion furnace 5 and separated from the bed material in the material separator 8 is introduced into the passage 12 in the inner pipe 14 of the double-pipe heat exchanger 14. The gasification gas is heated by the exhaust gas flowing though the passage 12 while it is passed through the passage 13, so that tar contained in the gasification gas is decomposed. The attaching status of the tar in the passage 13 is ascertained through the inspection window 17; when the tar attaches, additional fuel is fed to the additional heater 16 so as to increase in temperature the exhaust gas, In a case where the gasification and exhaust gas passages are formed in the inner pipe 10 and between the pipes 10 and 11, respectively, the exhaust gas from the combustion furnace 5 and separated in the separator 8 is introduced into the passage between the pipes 10 and 11 while the gasification gas is introduced into the passage in the pipe 10.

The gasification gas having been passed through the passage 13 in the heat exchanger 14 with the tar contained being decomposed is heat-exchanged with water and air in the thermal energy recovery device 18 and is heat-recovered, and then is introduced into the internal-combustion engine 19 and is burned, so that the internal-combustion engine 19 is driven to produce electricity through the electric generator 20. The exhaust gas having driven the engine 19 is discharged through the flue 21 to atmosphere; the exhaust gas having been passed through the passage 12 in the heat exchanger 14 for heating of the gasification gas is further heat-recovered in the thermal energy recovery device 22 and is discharged through the flue 21 to atmosphere. The steam produced in the recovery device 18 is fed to the bottom of the gasification furnace while the fluidizing reactant gas produced in the recovery device 18 is fed to the bottoms of the furnaces 2 and 5 for formation of the fluidized beds 1 and 4, respectively, As a result, in comparison with the conventional recovery of tar through the scrubber 102 and tar/water separator 108 and feeding and burning of the recovered tar to and in the combustion furnace 110, it is not costly in terms of wastewater treatment and gasification efficiency can be enhanced. Also in comparison with the conventional arrangement of the gasification furnace followed by the reforming furnace to which oxygen is fed to partially burn the gasification gas, the concentration of the carbon dioxide is not increased and enhancement of the gasification efficiency is hopeful. It is effective in terms of arrangement space that the gasification gas passage 13 of the tar decomposer is vertically arranged.

Thus, tar contained in the gasification gas can be effectively decomposed without use of water or the like; tar can be prevented from attaching to the piping or the like; a long-term operation can be conducted; and gasification efficiency can be enhanced.

[Embodiment 2]

Figure 3:
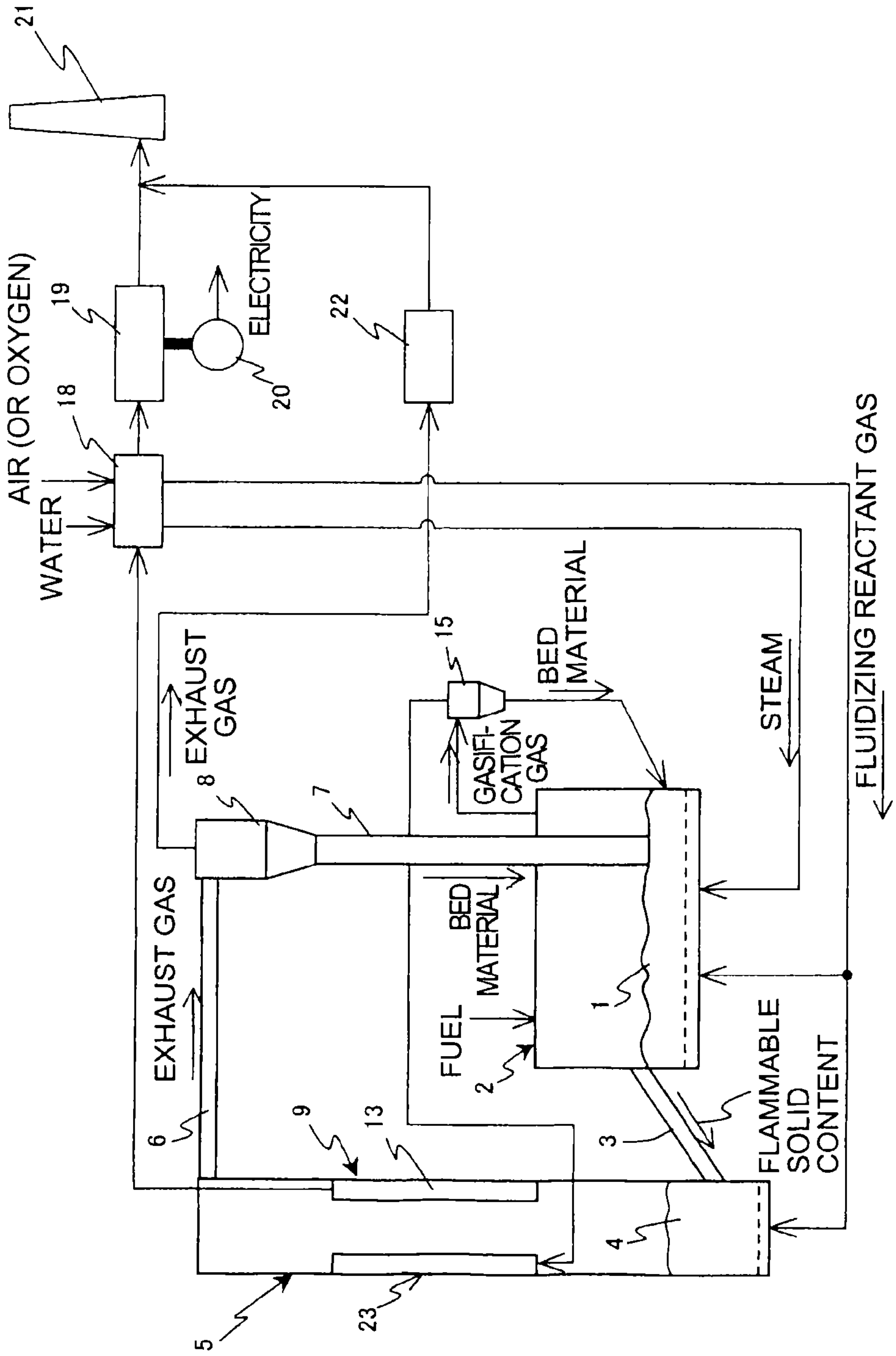
FIG. 3 An overall schematic view showing a second embodiment of the invention.

FIG. 3 shows a second embodiment of the invention in which parts identical with those shown in FIG. 2 are represented by the same reference characters, its fundamental structure being similar to that shown in FIG. 2. The present embodiment is characteristic as shown in FIG. 3 in that tar decomposer 9 is constituted by a heat exchanger 23 which heats; by heat of a combustion furnace 5, gasification gas introduced into a gasification gas passage 13 which in turn is formed on an inner surface of the furnace 5. It goes without saying that the gasification gas passage 13 on the inner surface of the furnace 5 may be, as needs demand, in the form of spiral passage just like the embodiment of FIG. 2 so as to prolong the dwell time of the gasification gas in the heat exchanger 23.

In the embodiment shown in FIG. 3, the gasification gas produced in a gasification furnace 2 and separated from the bed material in a material separator 15 is introduced into the gasification gas passage 13 of the heat exchanger 23 constituting the tar decomposer 9 and is heated by the heat of the combustion furnace 5 while being passed through the passage 13, whereby the tar contained in the gasification gas is decomposed.

[Embodiment 3]

Figure 4:
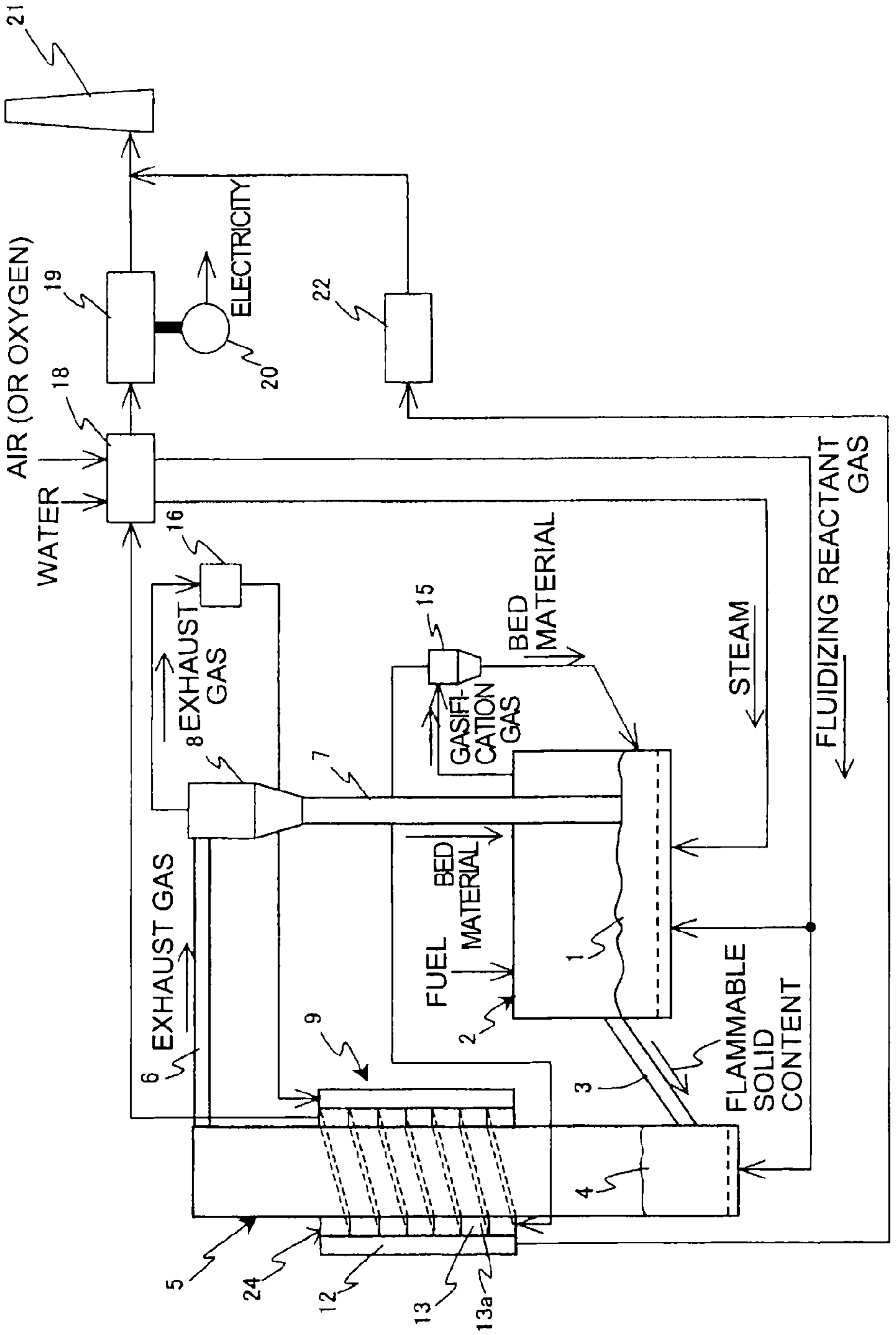
FIG. 4 An overall schematic view showing a third embodiment of the invention.

FIG. 4 shows a third embodiment of the invention in which parts identical with those shown in FIG. 2 are presented by the same reference characters, its fundamental structure being similar to that shown in FIG. 2. The present embodiment is characteristic as shown in FIG. 4 in that tar decomposer 9 is constituted by a heat exchanger 24 which heats, by heat of a combustion furnace 5, gasification gas introduced into a gasification gas passage 13 which in turn is formed on an outer surface of the furnace 5. In the embodiment of FIG. 4, the gasification gas passage 13 formed on the outer surface of the furnace 5 is in the form of a spiral passage 13*a* with heat storage material (not shown) so that high temperature can be retained while dwell time of the gasification gas in the heat exchanger 24 is secured. An exhaust gas passage 12 is formed on an outer surface of the gasification gas passage 13 of the heat exchanger 24 so as to introduce exhaust gas from the combustion furnace 5 and elevated in temperature by the additional heater 16 into the passage 12. When enough dwell time of the gasification gas in the heat exchanger 24 can be ensured, the gasification gas passage 13 may not necessarily be in the form of spiral passage 13*a;* when the exhaust gas discharged from the combustion furnace 5 has sufficiently high temperature, the additional heater 16 may not be necessarily provided.

In the embodiment shown in FIG. 4, the gasification gas produced in the gasification furnace 2 and separated from the bed material in the separator 15 is introduced into the gasification gas passage 13 of the heat exchanger 24 constituting the tar decomposer 9, the exhaust gas from the combustion furnace 5 and separated from the bed material in the separator 8 being introduced into the passage 12 of the heat exchanger 24; the gasification gas is heated by heat transmitted from the combustion furnace 5 and by the exhaust gas flowing through the passage 12 while the gasification gas is passed through the passage 13, whereby the tar contained in the gasification gas is decomposed.

[Embodiment 4]

Figure 5:
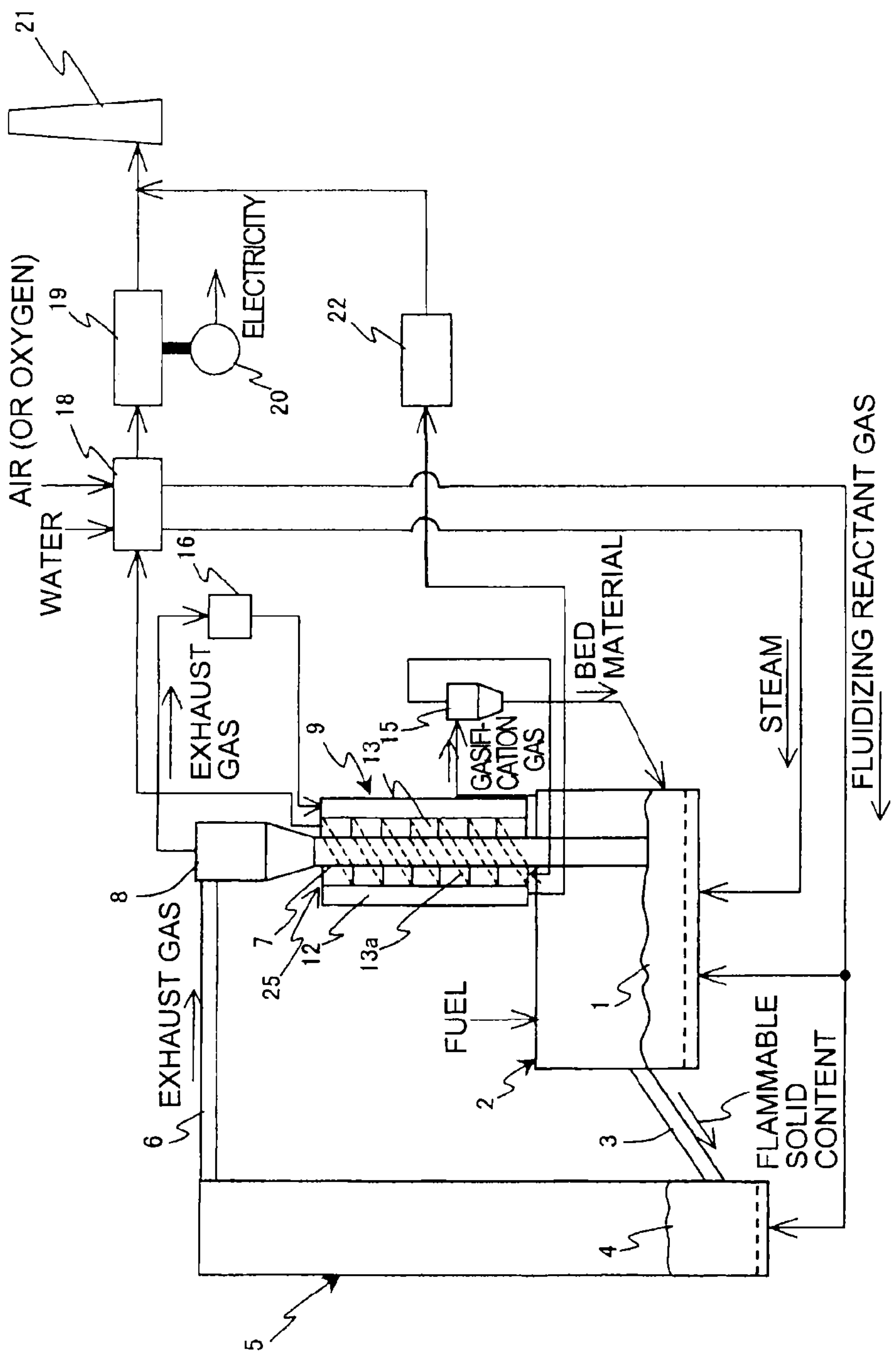
FIG. 5 An overall schematic view showing a fourth embodiment of the invention.

FIG. 5 shows a fourth embodiment of the invention in which parts identical with those shown in FIG. 2 are represented by the same reference characters, its fundamental structure being similar to that shown in FIG. 2, The present embodiment is characteristic as shown in FIG. 5 in that tar decomposer 9 is constituted by a heat exchanger 25 which heats, by heat of a downcomer 7 guiding the bed material separated in a material separator 8 to a gasification furnace 2, gasification gas introduced into a gasification gas passage 13 formed on an outer surface of the downcomer 7. In the embodiment of FIG. 5, the gasification gas passage 13 formed on the outer surface of the downcomer 7 is in the form of a spiral passage 13*a* with heat storage material (not shown), so that high temperature can be retained while enough dwell time of the gasification gas in the heat exchanger 25 is ensured. An exhaust gas passage 12 is formed on an outer surface of the gasification gas passage 13 of the heat exchanger 25, exhaust gas from a combustion furnace 5 and elevated in temperature by additional heater 16 being introduced into the passage 12. When enough dwell time of the gasification gas in the heat exchanger 25 can be ensured, the gasification gas passage 13 may not necessarily be the spiral passage 13*a*; when the exhaust gas from the combustion furnace 5 has sufficiently high temperature, the additional heater 16 may not be necessarily provided.

In the embodiment shown in FIG. 5, the gasification gas produced in the gasification furnace 2 and separated from the bed material in the separator 15 is introduced into the gasification gas passage 13 of the heat exchanger 25 constituting the tar decomposer 9, the exhaust gas from the combustion furnace 5 and separated from the bed material in the separator 8 being introduced into the passage of the heat exchanger 25. The gasification gas is heated by the heat transmitted from the downcomer 7 and by the exhaust gas flowing through the passage 12 while the gasification gas is passed through the passage 13, whereby the tar contained in the gasification gas is decomposed.

As a result, in comparison with conventional recovery of tar by the scrubber 102 and tar/water separator 108 and feeding and burning of the recovered tar to and in the combustion furnace 110, in the embodiments shown in FIGS. 3, 4 and 5, it becomes not costly in terms of waste-water treatment and gasification efficiency can be enhanced just like the embodiment shown in FIG. 2. Also in comparison with conventional arrangement of the gasification furnace followed by the reforming furnace to which oxygen is fed to partially burn the gasification gas, the concentration of carbon dioxide is not increased and enhancement of gasification efficiency is hopeful.

Thus, just like the embodiment shown in FIG. 2, also in the embodiment shown in FIGS. 3, 4 and 5, tar contained in the gasification gas can be efficiently decomposed without use of water or the like; tar can be prevented from attaching to the piping or the like; a long-term operation can be conducted; and gasification efficiency can be enhanced.

It is to be understood that a fuel gasification system of the invention is not limited to the above embodiments and that various changes and modifications may be made without departing from the scope of the invention.

The invention claimed is:

1. A fuel gasification system comprising:

a gasification furnace comprising a fluidized bed formed by fluidizing reactant gas and configured to gasify charged fuel into gasification gas and flammable solid content;

a combustion furnace in flow communication with the flammable solid content generated in the gasification furnace together with bed material and comprising a fluidized bed formed by fluidizing reactant gas to burn the flammable solid content and produce an exhaust gas;

a material separator in flow communication with the combustion furnace and configured to separate bed material from the exhaust gas introduced from the combustion furnace to feed the separated bed material to said gasification furnace;

a further material separator in flow communication with the gasification furnace and configured to separate bed material from the gasification gas introduced from the gasification furnace to feed the separated bed material to said gasification furnace; and a tar decomposer configured to heat the gasification gas produced in the gasification furnace to decompose tar contained in said gasification gas, wherein the tar decomposer includes a double-pipe heat exchanger comprising coaxially arranged inner and outer pipes, and wherein the double pipe heat exchanger includes an exhaust gas passage in the inner pipe into which the exhaust gas from the combustion furnace and separated in the material separator is introduced, and a gasification gas passage between the inner and outer pipes into which the gasification gas produced in the gasification furnace and separated from the bed material in the further material separator is introduced.

2. A fuel gasification system as claimed in claim 1, wherein the gasification gas passage is a spiral passage.

3. A fuel gasification system as claimed in claim 1, further comprising an additional heater for elevating in temperature the exhaust gas introduced into the exhaust gas passage.

4. A fuel gasification system as claimed in claim 3, wherein the gasification gas passage is a spiral passage.

* * * * *